(12) United States Patent
Lee

(10) Patent No.: US 6,969,000 B2
(45) Date of Patent: Nov. 29, 2005

(54) OPTICAL MODULE APPARATUS EQUIPPED WITH A LATCH COUPLER

(75) Inventor: Ta-Yi Lee, Taipei (TW)

(73) Assignee: Lite-On Technology Corporation, Taipei (TW)

(*) Notice: Subject to any disclaimer, the term of this patent is extended or adjusted under 35 U.S.C. 154(b) by 10 days.

(21) Appl. No.: 10/833,333

(22) Filed: Apr. 28, 2004

(65) Prior Publication Data

US 2005/0242184 A1 Nov. 3, 2005

(51) Int. Cl.$^7$ ............................................. G06K 7/10
(52) U.S. Cl. ...................... 235/454; 235/461; 235/470; 235/479; 235/462.01
(58) Field of Search .............................. 235/454, 461, 235/470, 479, 462.01; 355/39, 58, 84, 113; 358/401, 408, 296, 302

(56) References Cited

U.S. PATENT DOCUMENTS

| | | | | |
|---|---|---|---|---|
| 6,335,802 B1 * | 1/2002 | Hung-Che et al. | .......... | 358/296 |
| 2001/0050784 A1 * | 12/2001 | Lam et al. | ................. | 358/474 |
| 2004/0012824 A1 * | 1/2004 | Haas et al. | ................. | 358/474 |

* cited by examiner

Primary Examiner—Karl D. Frech
(74) Attorney, Agent, or Firm—Rabin & Berdo, P.C.

(57) ABSTRACT

An optical module apparatus equipped with a latch coupler includes a carrier movable on a guiding rod. The guiding rod is coupled with a turnable check member. When the optical module apparatus is on a flat and using position, the check member may pass through a check trough to enable the carrier to move freely and linearly and reciprocally. When the optical module apparatus is mounted in an inclined manner and moved away from the using position, the check member is subject to the gravity force and turns in parallel with the direction of the gravity force, and is latched on the check trough to restrict the moving range of the carrier. Thus the optical module apparatus may be prevented from moving by external forces during transportation and avoid being damaged.

7 Claims, 4 Drawing Sheets

OPTICAL MODULE APPARATUS EQUIPPED WITH A LATCH COUPLER

FIELD OF THE INVENTION

The present invention relates to a latch coupler structure adopted for use on optical module apparatus that have a movable carrier such as scanners, multi-function peripherals (MFPs) and the like, and particularly to an optical module apparatus that has a latch structure which restricts the moving condition of the carrier according to the mounting condition of the optical module apparatus.

BACKGROUND OF THE INVENTION

In the digital technology area, the development of photoelectric technology has spawned many different electronic devices such as scanners, digital cameras, digital video cameras, and the like. The scanner can rapidly transform paper documents to electronic files, hence is widely used in paperless office environments.

A conventional scanner includes at least a case, a lid, an optical module and a transmission mechanism. The case has a scan window. The lid is pivotally coupled on one side of the case in a movable manner. The optical module and the transmission mechanism are located in the case. The optical module is mounted onto a carrier. The transmission mechanism is coupled with the carrier for moving the optical module reciprocally within the range of the scan window. Because the optical module determines the quality of the scanning result of the scanner, and the optical module is a movable mechanism, to prevent the optical module from undue vibration during transportation or carrying resulting in focus error or damage, scanner manufacturers usually include a latch coupler on the carrier of the optical module. Before the scanner is shipped from the plant, the carrier is anchored by the latch coupler to prevent the optical module from being damaged during transportation or carrying. Users have to remove the latch coupler before use at the first time; otherwise the scanner cannot perform a scanning operation.

Although scanner manufacturers have clearly reminded users to remove the latch coupler before use, many users still neglect this procedure. They start the scanner without removing the latch coupler. As a result, the transmission mechanism or the optical module can be damaged.

To remedy this problem, some vendors have installed the latch coupler on the case close to the connection port. When the latch coupler latches the carrier, it also covers the connection port, so that users have to remove the latch coupler to connect the flat cable or power cord to the connection port. This scheme can prevent users from starting the scanner before the latch coupler has been removed. Such a design aims to prevent damages during transportation for vendors and the mistaken first time operation of users. However, when users move the scanner themselves after first installation, they do not always remember to latch the latch coupler again, or try to omit this step to save the trouble of removing and reconnecting the connection line. Hence this is not a desirable design from user's perspective.

SUMMARY OF THE INVENTION

In view of the foregoing concerns, the present invention provides an optical module apparatus that equips with a latch coupler. The invention can automatically latch and restrict the movement of the carrier according to the mounting position of the optical module apparatus to prevent electronic elements, such as the optical module located on the carrier, from being damaged.

The optical module apparatus equipped with a latch coupler according to the invention includes a guiding rod and a carrier. The carrier is movable linearly and reciprocally on the guiding rod. In addition, the guiding rod is coupled with a check member which is turning freely. The carrier has a check trough corresponding to the check member. When users want to use the optical module apparatus, they have to place the optical module apparatus on a flat object such as the tabletop. The check member is subject to the gravity force and can pass through the check trough so that the carrier can move freely and linearly and reciprocally on the guiding rod. If the optical module apparatus is installed in an inclined condition, or a plurality of optical module apparatus are positioned in an upright manner in a carton for transportation and the carriers generally return to an idle position, the check member turns under the gravity force and latches on the check trough. Thus the moving range of the carrier is restricted. Therefore, the carrier is prevented from moving before the optical module apparatus is in use condition, or from being transported. The transmission mechanism or the optical module mounted on the carrier is protected.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
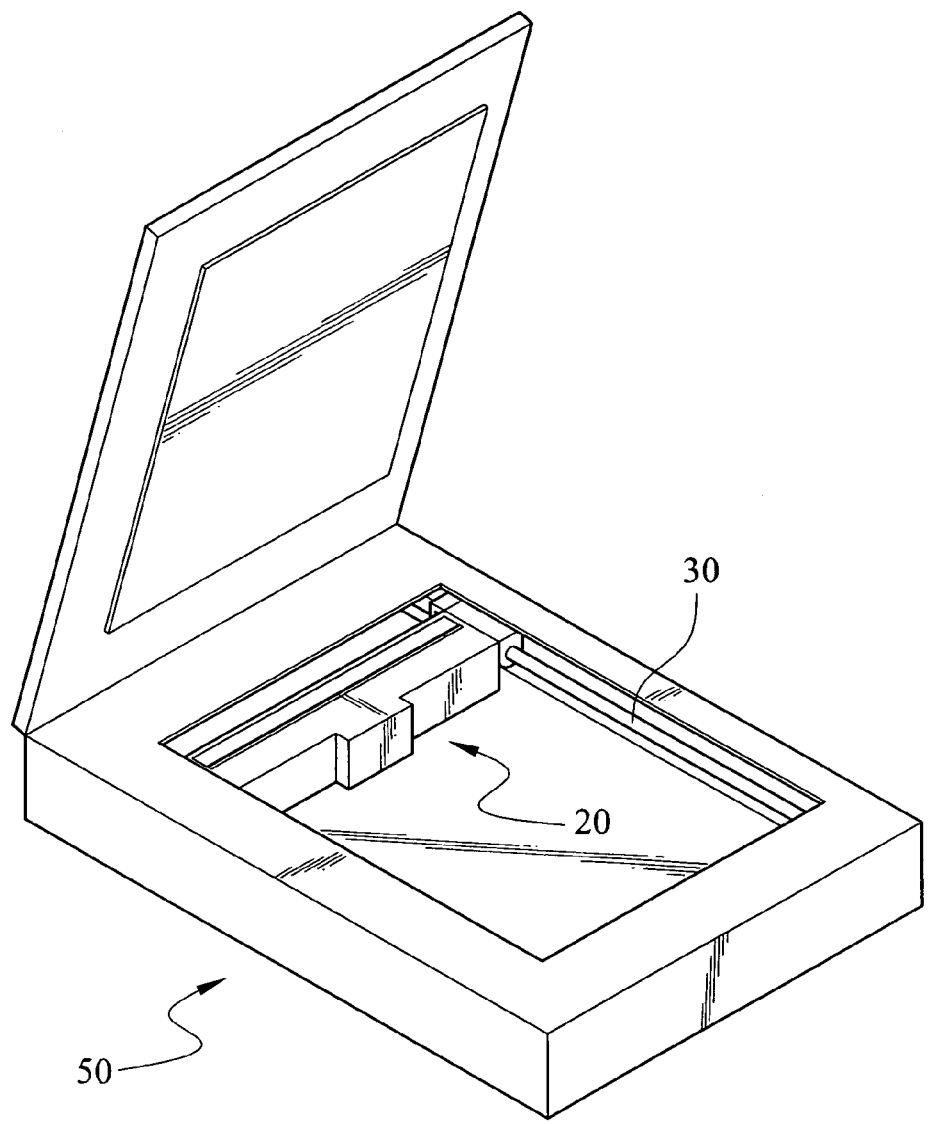
FIG. 1 is a perspective view of the optical module apparatus equipped with a latch coupler according to the invention.
Figure 2:
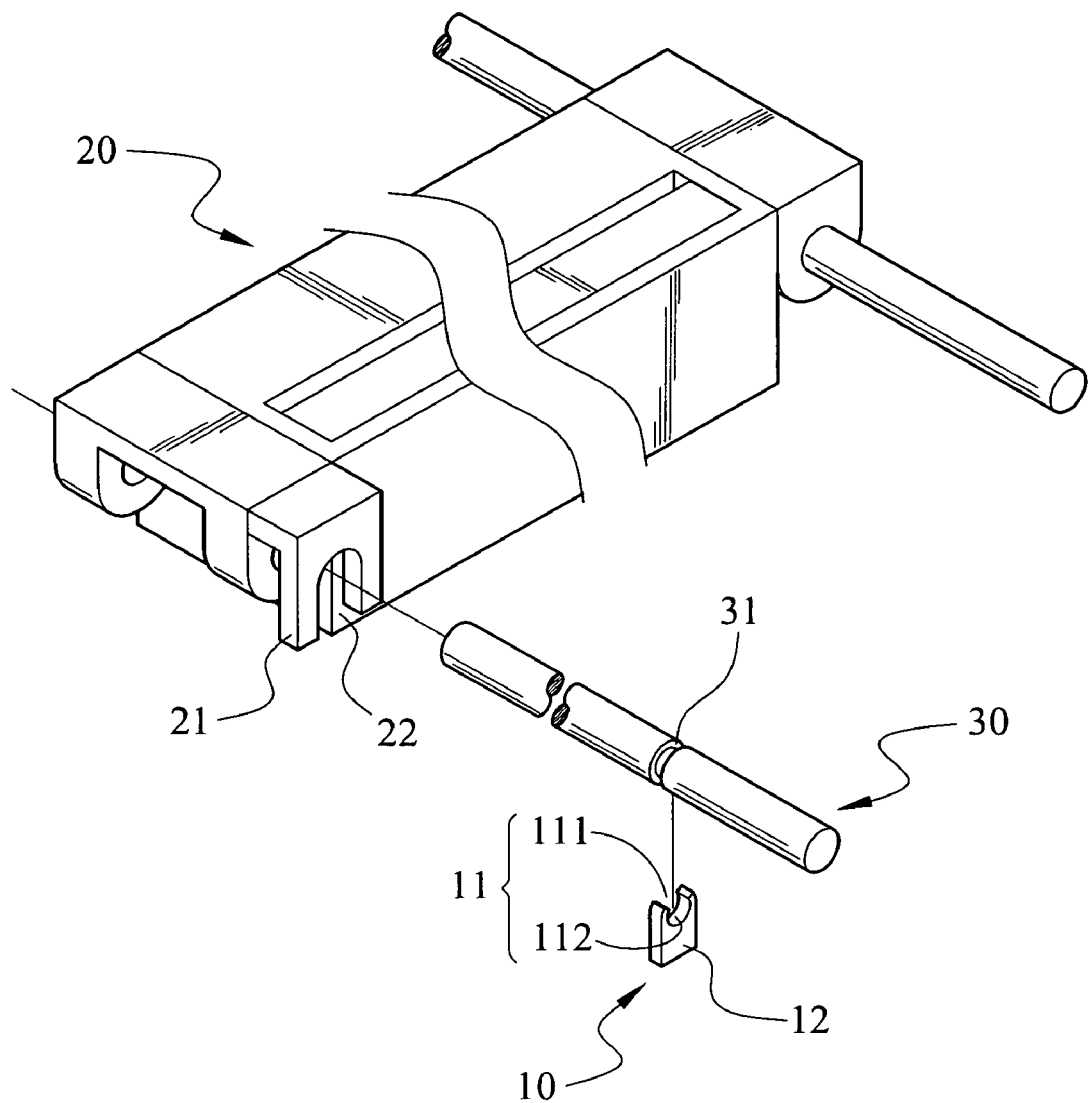
FIG. 2 is a schematic view of the carrier of the optical module apparatus equipped with a latch coupler according to the invention.
Figure 3:
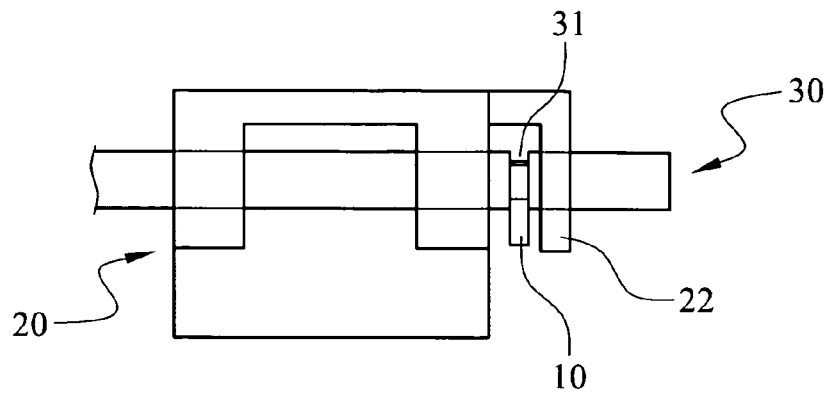
FIG. 3 is a front view of the carrier according to the invention.
Figure 4:
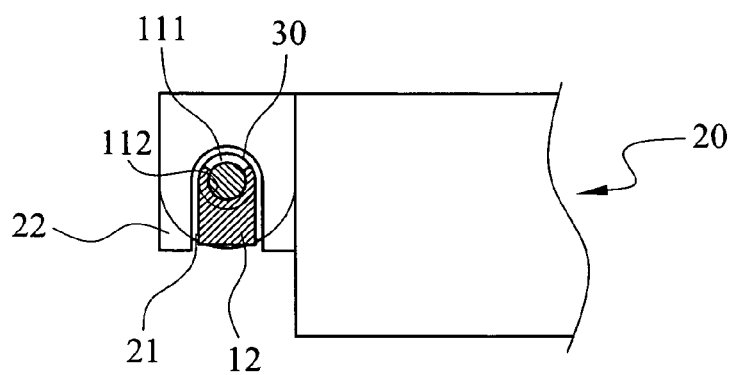
FIG. 4 is a side view of the carrier according to the invention.

The present invention aims to provide a latch mechanism adopted for use on a carrier such as the optical module apparatus of a scanner and the like. The following embodiments use the scanner as an example. Of course, this is not a limitation. Other optical module apparatus that have a movable carrier which requires to be latched during transportation are within the covering scope of the present invention.

Refer to FIGS. 1 through 4 for the invention adopted for use on a movable carrier such as an optical module apparatus of a scanner 50. The scanner 50 includes at least a guiding rod 30 and a carrier 20. The carrier 20 carries an optical module (not shown in the drawings) which consists of electronic elements. The carrier 20 is driven by a transmission mechanism (not shown in the drawings) to move linearly and reciprocally on the guiding rod 30. The optical module scans objects, such as documents. The image scanning technology is well developed and known in the art, and forms no part of the invention, thus this portion is omitted in the further discussion.

The optical module apparatus equipped with a latch coupler according to the invention further includes a check member 10. The check member 10 includes a hook section 11 and a gravity section 12. The hook section 11 has a notch 111 and a clip opening 112. The notch 111 has a gap opening smaller than the diameter of the clip opening 112 so that the hook section 11 is coupled on the guiding rod 30 without disconnection. In addition, the guiding rod 30 has a groove 31 to couple with the hook section 11 to enable the check member 10 to clip the guiding rod 30 securely. Lubrication oil may be dispensed to the coupling juncture of the hook section 11 and the guiding rod 30 for smooth turning of the check member 10 about the guiding rod 30.

The check member 10 has a gravity section 12 which has a selected weight, and makes check member 10 turn about the guiding rod 30 under the gravity force. Thereby the check member 10 is hung in a position in parallel with the gravity force in normal condition. Namely, the coupling condition between the check member 10 and the guiding rod 30 alter according to the mounting position of the scanner 50.

The carrier 20 has a suspension arm 21, which has a check trough 22 corresponding to the check member 10. When the scanner 50 is in use, it is generally placed on a flat object such as the tabletop. The flat mounting condition is defined as a using position. When the scanner 50 is in the using position, the check member 10 passes through the check trough 22, and the carrier 20 can move freely and linearly and reciprocally on the guiding rod 30 to perform image scanning operation for documents.

Figure 5:
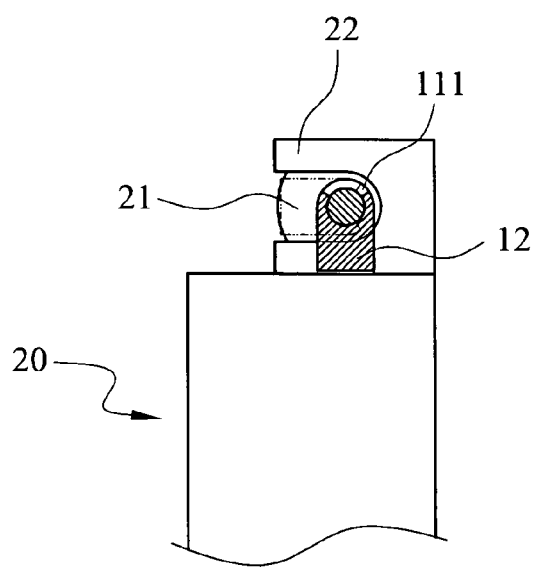
FIG. 5 is a schematic view of the optical module apparatus according to the invention in an upright condition for transportation.

Referring to FIG. 5, for transportation of the optical module apparatus such as the scanner 50, it is a usual practice to place a plurality of scanners 50 in an upright manner in a carton (not shown in the drawing). The check member 10 turns about the guiding rod 30 under the gravity force. Hence the check member 10 is latched on the check trough 22. Namely, when the scanner 50 is positioned horizontally in the use condition, the check member 10 can pass through the check trough 22. When the scanner 50 is positioned in an inclined manner or upright condition in a carton, the check member 10 cannot pass through the check trough 22. Therefore the carrier 20 remains in an unused and an idle condition, especially during transportation. Thus it cannot be moved, even while subjected to the impact of an external force. And the transmission mechanism that drives the carrier 20 or the electronic elements installed on the carrier 20 are prevented from being damaged. The idle position is different depending on different products. In this embodiment, the idle position means that the carrier 20 is not yet operating, and returns to a preset start condition in the scanner 50, and the check member 10 can restrict the movement of the carrier 20.

Figure 6A:
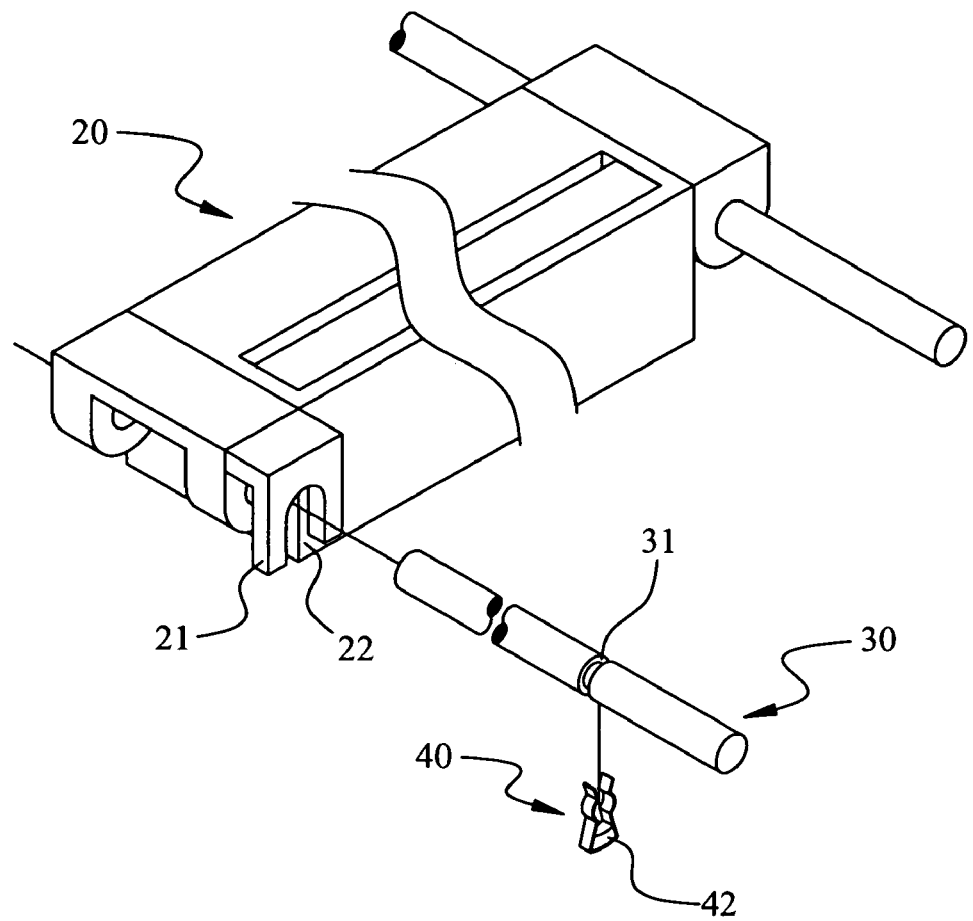
FIG. 6A is schematic view of another embodiment of the optical module apparatus according to the invention.
Figure 6B:
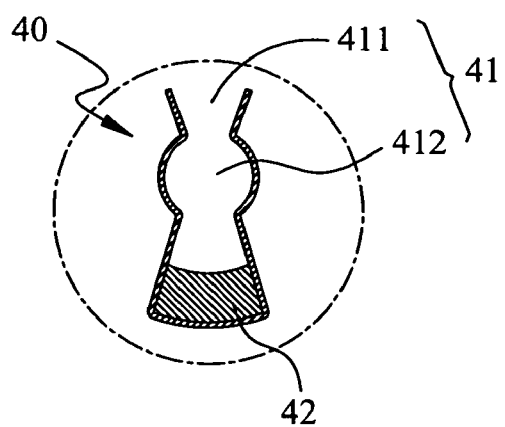
FIG. 6B is cross-section view of the annular hook of the optical module apparatus in FIG. 6A according to the invention.

The check member 10 may be formed in many ways. FIG. 6A and FIG. 6B illustrate another embodiment of the invention. It is formed in an annular hook 40, which includes a hook section 41 and a balance weight 42 connecting to each other. The hook section 41 has a notch 411 and a clip opening 412 communicating with each other. For installation, push the hook section 41 towards two sides to wedge the guiding rod 30 into the clip opening 412 through the notch 411. The notch 411 has a gap opening smaller than the diameter of the clip opening 412 to prevent the annular hook 40 from escaping the guiding rod 30. The balance weight 42 has a selected weight. According to the mounting position of the scanner 50 and the resulting direction of the gravity force, the annular hook 40 may turn about the guiding rod 30 and in parallel with the direction of the gravity force in normal condition. By the same token, when the scanner 50 is put in a flat and using position, the annular ring 40 can pass through the check trough 22. On the contrary, when the scanner 50 is position in an inclined manner or an upright condition in a carton, the carrier 20 generally returns to an idle condition, and the annular hook 40 cannot pass through the check trough 22. Therefore, the carrier 20 is confined to the idle position.

In summary, the optical module apparatus equipped with a latch coupler according to the invention has a check member 10 coupling on the guiding rod 30, and the check member 10 can freely pass through the check trough 22 of the carrier 20 only when the scanner 50 is in the using position. If the scanner 50 is moved away from the using position and inclined, or upright in a carton for transportation, the check member 10 will turn about the guiding rod 30 due to gravity force and is in parallel with the direction of the gravity force so that the check member 10 cannot pass through the check trough 22 and restricts the moving range of the carrier 20. Thus the carrier 20 may be prevented from improper movement, resulting in damaging of the electronic elements installed on the carrier 20.

In other words, when the product is mounted in a normal using position, the carrier 20 is movable freely. If the product is moved away from the using position and positioned in an inclined manner, or upright in a carton for transportation, the check member 10 cannot pass through the check trough 22 and restricts the moving range of the carrier 20. Thus the mounting position of the scanner 50 and the corresponding direction of the gravity force can dynamically control the latch condition of the carrier 20 without the user's intervention. The structure is simple and costs less. It is a novel design, offering more practicality than the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An optical module apparatus equipped with a latch coupler, comprising:
   a carrier movable on a guiding rod having a check trough; and
   a check member coupled on the guiding rod turnable freely thereon;
   wherein the check trough corresponds to the check member in such a manner that the check member is allowed to pass through the check trough when the optical module apparatus is located on a using position, then the carrier is movable freely on the guiding rod in a linear and reciprocal fashion; when the optical module is tilted and moved away from the using position, and the carrier returns to an idle position, the check member is turned due to the gravity force thereof and latched on the check trough to restrict the moving range of the carrier.

2. The optical module apparatus of claim 1, wherein the check member includes a gravity section which has a selected weight to turn the check member about the guiding rod under the gravity force.

3. The optical module apparatus of claim 1, wherein the check member includes a hook section which is coupled on the guiding rod.

4. The optical module apparatus of claim 3, wherein the guiding rod has a groove corresponding to the hook section to couple with the check member.

5. The optical module apparatus of claim 3, wherein the hook section has a notch and a clip opening, the notch having a gap opening smaller than the diameter of the clip opening to prevent the check member from escaping the guiding rod.

6. The optical module apparatus of claim 1, wherein the check member is an annular hook which has a balance weight of a selected weight which is subject to the gravity force to allow the check member turnable about the guiding rod.

7. The optical module apparatus of claim 1, wherein the coupling location between the check member and the guiding rod is dispensed with lubrication oil.

* * * * *